(12) United States Patent
Ding et al.

(10) Patent No.: US 12,339,701 B1
(45) Date of Patent: Jun. 24, 2025

(54) INSERTION DELAY AND AREA TRADEOFF FOR BUFFERING SOLUTION SELECTION IN CLOCK TREE SYNTHESIS

(71) Applicant: Cadence Design Systems, Inc., San Jose, CA (US)

(72) Inventors: Yi-Xiao Ding, Austin, TX (US); Sheng-En David Lin, Austin, TX (US); Natarajan Viswanathan, Austin, TX (US); Charles Jay Alpert, Cedar Park, TX (US)

(73) Assignee: Cadence Design Systems, Inc., San Jose, CA (US)

( * ) Notice: Subject to any disclaimer, the term of this patent is extended or adjusted under 35 U.S.C. 154(b) by 265 days.

(21) Appl. No.: 18/347,298

(22) Filed: Jul. 5, 2023

(51) Int. Cl.
*G06F 1/14* (2006.01)
*G06F 1/12* (2006.01)

(52) U.S. Cl.
CPC . *G06F 1/14* (2013.01); *G06F 1/12* (2013.01)

(58) Field of Classification Search
CPC ..................................... G06F 1/14; G06F 1/12
See application file for complete search history.

(56) References Cited

U.S. PATENT DOCUMENTS

| | | | | |
|---|---|---|---|---|
| 10,936,777 B1* | 3/2021 | Gao | ......................... | G06F 30/31 |
| 10,963,620 B1* | 3/2021 | Ding | ..................... | G06F 30/398 |
| 11,347,923 B1* | 5/2022 | Ding | ..................... | G06F 30/392 |
| 11,514,222 B1* | 11/2022 | Lin | ........................ | G06F 30/394 |
| 11,520,959 B1* | 12/2022 | Ding | ........................ | G06F 30/39 |
| 11,526,650 B1* | 12/2022 | Ding | ..................... | G06F 30/392 |
| 2004/0225984 A1* | 11/2004 | Tsao | .......................... | G06F 1/10 |
| | | | | 716/114 |
| 2009/0064068 A1* | 3/2009 | Ng | ........................... | G06F 30/39 |
| | | | | 716/113 |

* cited by examiner

*Primary Examiner* — Nimesh G Patel
(74) *Attorney, Agent, or Firm* — Schwegman Lundberg & Woessner, P.A.

(57) ABSTRACT

Aspects of the present disclosure include system, methods, and software for buffer insertions. In one example, a method includes receiving a clock signal network layout, wherein the clock signal layout comprises a clock source electrically coupled to a plurality of clock sinks via a plurality of net segments, and creating a plurality of buffering solutions, wherein each buffering solution of the plurality of buffering solutions comprises a plurality of buffers inserted on one or more net segments of plurality of net segments. The method further includes assigning each buffering solution a timing delay value and an area value, and selecting a buffering solution of the plurality of buffering solutions based on the timing delay value and the area value. The method additionally includes committing the selected buffering solution into an integrated circuit design comprising the clock signal network.

20 Claims, 8 Drawing Sheets

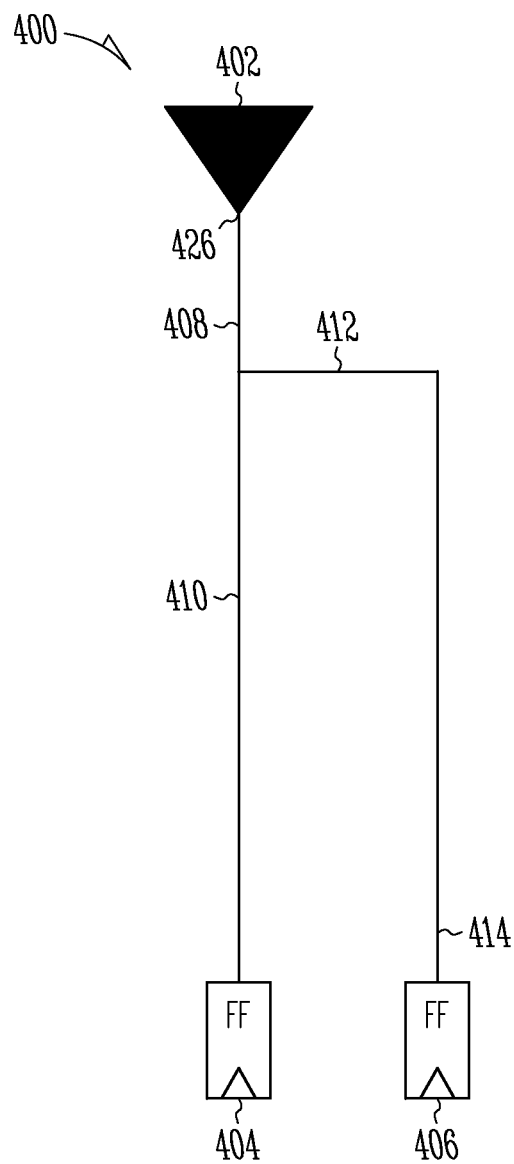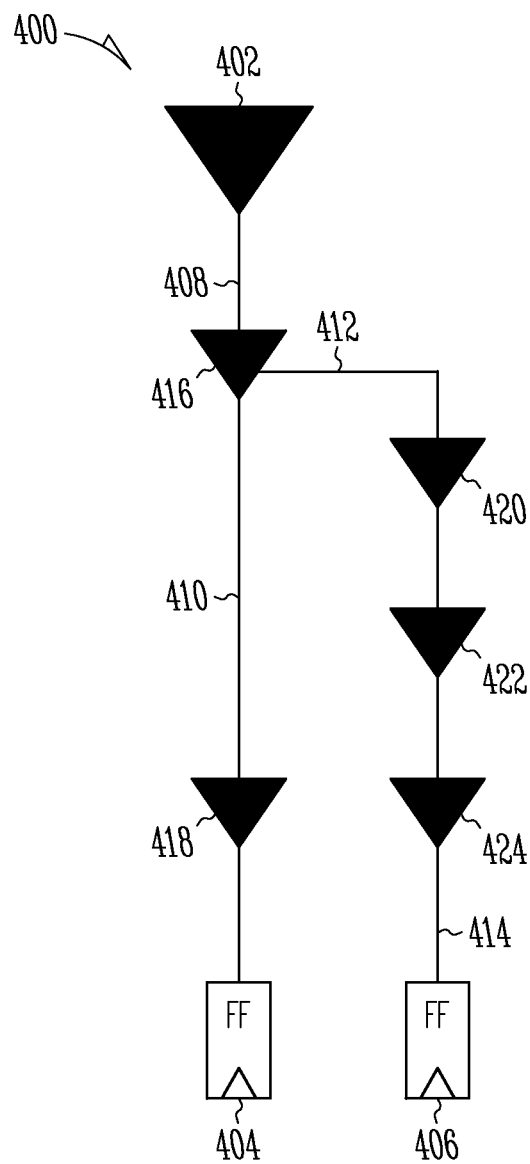
Fig. 4A
Fig. 4B

INSERTION DELAY AND AREA TRADEOFF FOR BUFFERING SOLUTION SELECTION IN CLOCK TREE SYNTHESIS

TECHNICAL FIELD

The present disclosure generally relates to the technical field of integrated circuit (IC) design. In particular, the present disclosure describes clock tree synthesis buffering solution selection with insertion delay and area tradeoff.

BACKGROUND

An IC clock transmits a clock signal that synchronizes various components of the IC. A clock structure, such as a clock tree, is an interconnected tree topology that transmits the clock signal from clock tree sources to clock tree sinks. Buffers are inserted into the clock tree to improve the delay of the clock signal from the clock tree sources to the clock tree sinks.

BRIEF DESCRIPTION OF THE SEVERAL VIEWS OF THE DRAWINGS

Various ones of the appended drawings merely illustrate example embodiments of the present inventive subject matter and cannot be considered as limiting its scope.

FIG. 4A depicts a section of clock signal network layout, according to some embodiments.

FIG. 4B illustrates the section of the clock signal network layout of FIG. 4A with buffers inserted, according to some embodiments.

DETAILED DESCRIPTION

Figure 1:
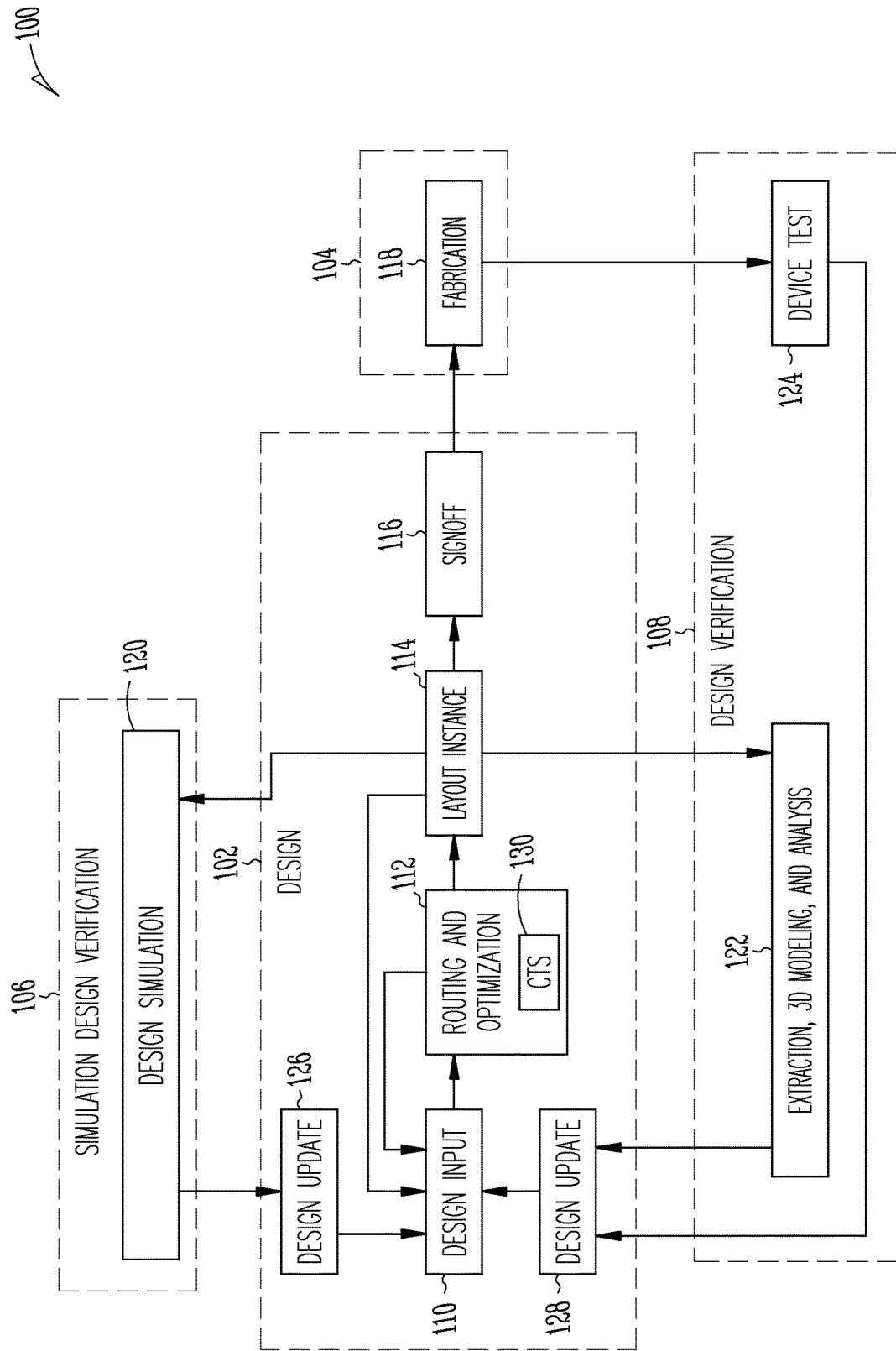
FIG. 1 illustrates an IC design process flow, according to some embodiments.

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

Certain IC devices include clock signals that are transmitted throughout an IC device for various purposes, such signal synchronization, data transmission, coordinating a sequence of actions, and so on. The IC device includes one or more clock tree sources, such as crystal oscillators, clock generators, and the like, that produce a periodic signal at a desired frequency. The periodic signal is then distributed from the one or more clock tree sources to one or more clock tree sinks via a clock tree network. For example, the clock sinks include registers or flip-flops that can store information, synchronized by the clock signal. In a circuit for using edge-triggered registers, when a clock edge (e.g., rising edge or falling edge) arrives at a register, the data stored at the register is updated.

During a physical design portion of an IC design process, certain circuit components and structures are placed at various locations of an IC layout. For example, during floorplanning and placement, the circuit components are placed to minimize area and wirelengths interconnecting the circuit components. After floorplanning, a clock tree synthesis (CTS) process is used, where clock trees are constructed to propagate clock signals from clock sources to clock sinks. In some examples, the CTS process is used to transmit a clock signal more efficiently to the clock sinks, for example, by using a clock tree network layout having multiple buffers and/or inverters. Various clock tree structures can be used, such as Y-trees, X-trees, H-trees, among others. The CTS process creates a clock tree network layout and inserts buffers in the various locations of clock tree network layout, for example, to improve or balance clock signal transmission delay.

Buffers come in different sizes, for example, larger buffers transmit signals faster with less delay than smaller buffer, but they occupy a larger die area and thus carry a larger cost. During CTS, buffers are inserted throughout the clock tree for various purposes. For example, to minimize skew and to meet target insertion delay. Insertion delay is the time clock signal takes to go from a clock tree source to a clock tree sink. Among a set of clock tree sinks, each sink can have different insertion delays. The skew is the difference between the minimum and maximum insertion delays for a set of clock tree sinks.

Buffer insertion can be used to fix design rule violations (DRVs) such as a slew/signal transition time, a maximum capacitance load, a max fanout (e.g., maximum number of inputs that are connected to one output), and/or max length (e.g., wire length) constraints. As used herein, the term "buffer" refers to both a standard buffer whose output value mirrors its input value and to an inverting buffer (e.g., an inverter) whose output value is a logical opposite of its input value.

Buffering solutions include various buffer placement possibilities. That is, buffers may be inserted in various arrangements, also referred to as "buffering solutions," to provide for desired timing conditions. During buffer insertion, in some examples, a buffering engine returns a set of buffering solutions for a net. Each buffering solution consists of one or more buffers of same or different sizes that are placed at different locations along the net. Different buffering solutions have different area costs and delay gains.

The techniques described herein provide for a clock delay and area based buffering solution selection process that assigns a return on investment (ROI) metric to the various buffering solutions. The ROI metric is derived via a slope approach that measures the slope of a root-pin slack (RPS) (e.g., buffering solution RPS) versus total cell area curve to provide for a quantifiable measure for each buffering solution, as further described below. The RPS is a timing slack at the root pin (e.g., driver pin) of, for example, the net being buffered. The timing slack is an indication of how much delay it takes for a clock signal to travel through a buffering solution. More positive slack indicates smaller delay, whereas more negative slack indicates larger delay. Delay thresholds can also be used, such a high threshold, a medium threshold, and a low threshold, that can partition the RPS versus total cell area curve to customize buffering solutions that balance area size versus timing delays based on user preferences. For example, high threshold can consider solutions with minimal delay, e.g. solutions with delay less than 5 picoseconds. Medium threshold can consider solutions with higher delays, such as delays less than 20 picoseconds. Low thresholds can then consider solutions with delay less than, for example, 80 picoseconds. Indeed, along a buffering solution curve, different delay thresholds can be used to select buffering solutions with better delay or with improved area use.

It may be beneficial to illustrate an example IC design process flow that incorporates the techniques described herein. Turning now to FIG. 1, the figure is a block diagram illustrating an example IC design process flow 100 that includes net partitioning and layer-based parasitic extraction, according to some examples. As shown, the IC design process flow 100 includes a design phase 102, a device fabrication phase 104, a simulation design verification phase 106, and a design verification phase 108. The design phase 102 involves an initial design input operation 110 where the basic elements and functionality of a device are determined, as well as revisions based on various analyses and optimization of a circuit design. This design input operation 110 is where block (e.g., functional) instances are used in the circuit design and any additional circuitry for the design around the blocks is selected. For example, a variety of electronic components such as amplifiers, registers, signal generators, and so on, may be provided as blocks to be used for a given device, e.g., radio frequency (RF) device. The initial strategy, tactics, and context for the device to be created are also generated in the design input operation 110 operation, depending on the particular design algorithm to be used.

In some embodiments, following an initial selection of design values in the design input operation 110, routing, timing analysis, and optimization are performed in a routing and optimization operation 112 operation, along with any other automated design processes. While the design process flow 100 shows the routing and optimization operation 112 occurring prior to a layout instance 114, routing, timing analysis, and optimization may be performed at any time to verify operation of a circuit design. For instance, in various examples, timing analysis in a circuit design may be performed prior to routing of connections in the circuit design, after routing, during register transfer level (RTL) operations, or as part of a signoff 116 as described below.

The routing and optimization operation 112 includes deriving various interconnections or routes between, for example, devices, pins, networks, layers, and so on. Accordingly, connection paths between pins and other components are generated as part of the routing and optimization operation 112. After design inputs are used in the design input operation 110 to generate a circuit layout and the routing and optimization operation 112 is performed, a layout is generated in the layout instance 114. The layout describes the physical layout dimensions of the device that match the design inputs. The layout instance 114 also includes one or more layers, e.g., metal layers, that define interconnections and components for each layer. Prior to the layout instance 114 being provided to a fabrication operation 118, the signoff 116 is performed on the circuit design defined by the layout instance 114. The signoff 116 includes verification steps that the layout instance 114 passes before being sent for manufacture.

After signoff verification via the signoff 116, a verified version of the layout instance 114 is used in the fabrication operation 118 to manufacture a device. Additional testing and design updates 126, 128 may be performed using designer inputs or automated updates based on design simulation operation 120 operations, or via extraction, three-dimensional (3D) extraction, 3D modeling, and analysis operations 122. Once the device is generated, the device can be tested as part of device test 124 operations and layout modifications generated based on actual device performance.

In the illustrated example, a clock tree synthesis process 130 is shown. The clock tree synthesis process 130 creates certain clock signal network layouts, by using certain structures, e.g, Y-trees, X-trees, H-trees, fishbone, and/or mesh, for the distribution of a clock signal among sequential parts (e.g., sequential logic parts) of the IC design process flow 100. Buffers are additionally placed at various locations of the clock signal network layout to minimize skew of the clock signal, to meet a target insertion delay, and to improve robustness of the layout. Each of the structures used for the clock signal network layout have certain advantages. For example, by using an H-tree layout, cross-corner scaling is better balanced, with clock sinks at corners of the layout receive the clock signal with minimal or no delay. Using an X-tree structure can save on interconnect length for certain circuit net segments, while Y-tree structures, when used at higher tree levels, provides for reduce power consumption. The H-tree, X-tree, and Y-tree structures can be used in combination as part of a clock signal network layout.

Once the clock signal network layout is created, one or more buffers candidates are inserted at various positions throughout the clock signal network layout. Several possible buffering solutions are created, and each buffering solution will have a different placement of buffers along nets, a different numbers of buffers of different types, and/or a different total number of buffers. Each buffering solution can also have a total layout area that is different from other buffering solutions. The techniques described herein will automatically generate a RPS (e.g., buffering solution RPS) versus total buffer cell area curve based on the buffering solutions. Thresholds (e.g., delay thresholds) can be applied to the curve. In certain examples, for buffering solutions satisfying a delay threshold, the buffering solutions are ranked based on ROIs or slopes. The slope or ROI of a buffering solution is measured against the buffering solution with minimal area. The more positive the slope, the better tradeoff between buffering solution delay and area.

Figure 2:
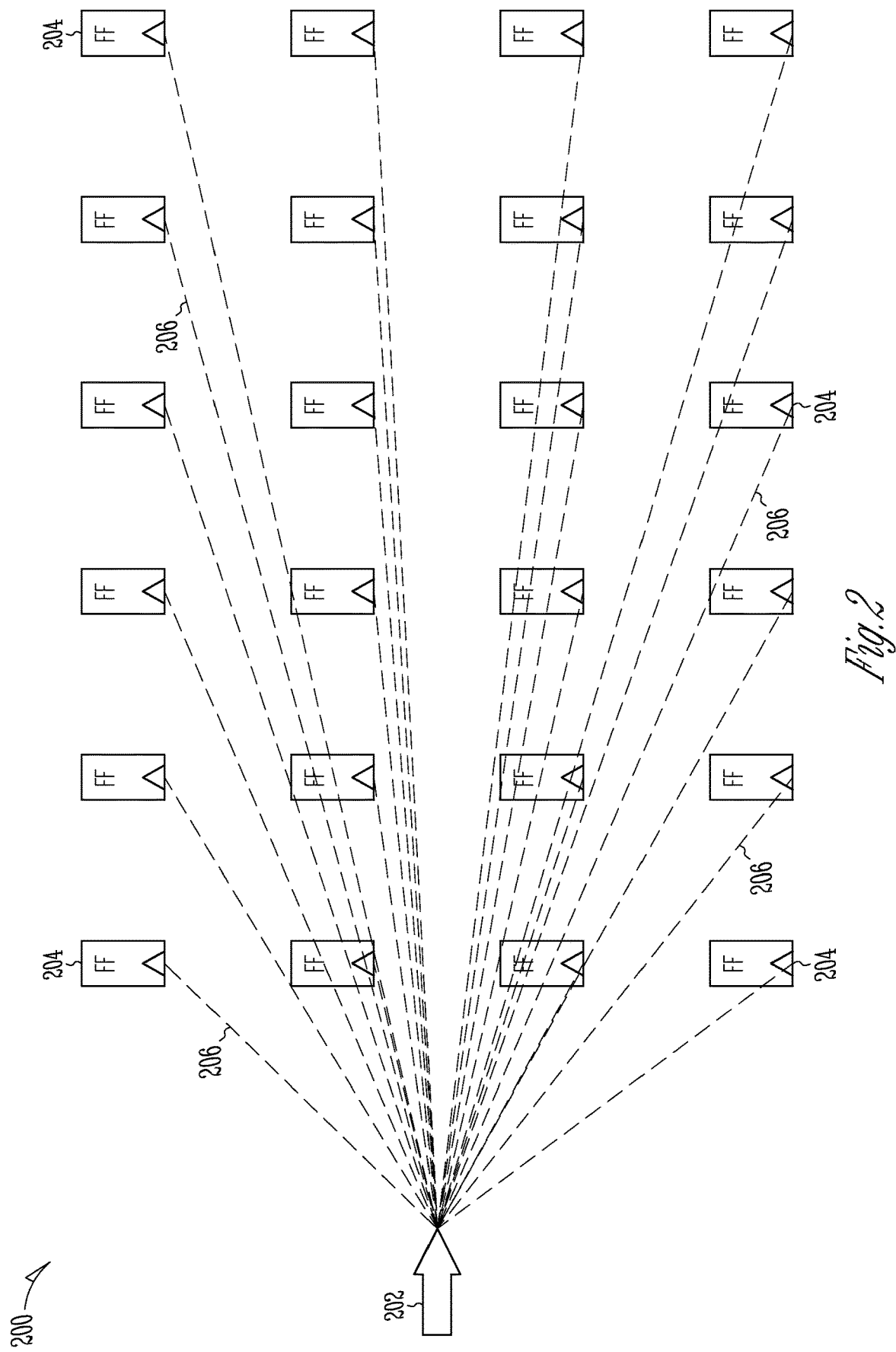
FIG. 2 illustrates a circuit layout having a clock source and multiple clock sinks, according to some embodiments.

It may be beneficial to illustrate an example circuit layout that incorporates a clock source and various clock sinks as part of a clock signal network. Turning now to FIG. 2, the figure illustrates an example circuit layout 200 having a clock source 202 electrically coupled to multiple clock sinks 204, e.g., flip-flops, according to some examples. More specifically, the clock source 202 illustrated in the figure is directly connected to the clock sinks 204 via direct paths 206. The resulting circuit layout 200, however, results in the clock sinks receiving a clock signal transmitted by the clock source 202 at different times, due, for example, to the different locations of the clock sinks 204 relative to the clock source 202. Clock sinks 204 closer to the clock source 202 will receive the clock signal before other clock sinks farther away from the clock source 202, resulting in unwanted skew and insertion delays. For example, resistance-capacitance (RC) variations among the direct path 206 caused by resistance and capacitance of nets along the direct paths 206 will in turn create skew and insertion delays. Additionally, RC and length variations of the direct paths 206 can result in jitter issues, clock signal integrity issues, noise issues, and so on.

Figure 3A:
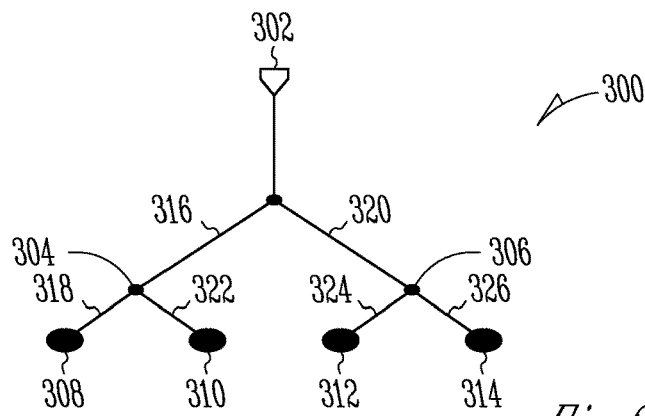
FIG. 3A illustrates a Y-Tree clock signal network structure, according to some embodiments.
Figure 3B:
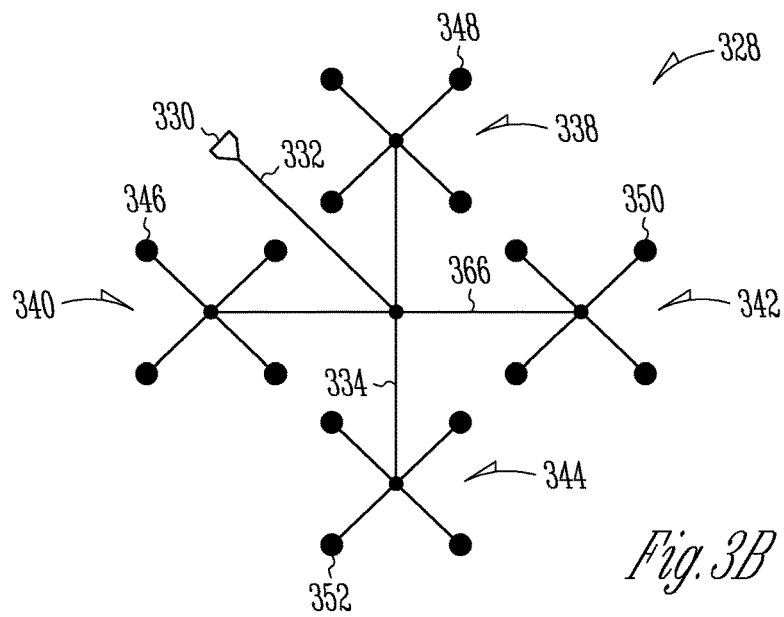
FIG. 3B illustrates an X-Tree clock signal network structure, according to some embodiments.
Figure 3C:
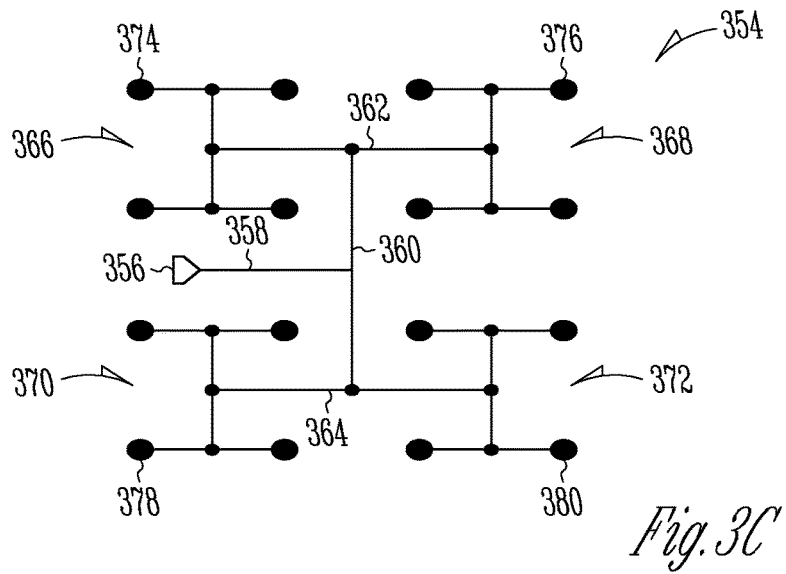
FIG. 3C illustrates an H-Tree clock signal network structure, according to some embodiments.

Clock signal networks can be created that use certain structures, as shown in FIGS. 3A-3C, that provide for improved clock signal propagation, minimal (or no skew), and robustness, among other enhancements, when compared to the circuit layout 200, according to some examples. In the depicted example of FIG. 3A, an example Y-tree structure 300 is shown. The Y-tree structure receives a clock signal via a clock source 302, and distributes the clock signal into nodes 304-314 through net segments 316-326. In some examples, nodes 304, 306 are buffers that provide for improved timing and signal quality as the signal travels into nodes 308-314. Nodes 308-314 can be clock sink nodes (e.g., flip-flops) that then receive the clock signal and the provide further logic signals to one or more sequential components of an IC design. The Y-tree structure 300 Y-tree, when used a higher tree levels or in shorter trees, provides for reduce power consumption.

In the depicted example of FIG. 3B, an example, X-tree structure 328 is shown. The X-tree structure 328 includes a clock source 330 transmitting the clock signal through a diagonal net segment 332 into a vertical net segment 334 and a horizontal net segment 336. The signal is further transmitted by the vertical net segment 334 and the horizontal net segment 336 into X clusters 338, 340, 342, 344. Each of the X clusters 338, 340, 342, 344 contains four nodes, such as four end nodes (e.g., clock sinks) 346, 348, 350, 352, respectively. In some examples, buffers may be placed along the various net segments of the X-tree structure 328 to further improve timing and clock signal integrity. Using the X-tree structure 328 can save on interconnect length for certain circuit net segments of a clock signal network layout.

An example H-tree structure 354 is shown in the example illustrated in FIG. 3C. In the depicted example, a clock source 356 is connected to a central net segment 358 and in turn the central net segment 358 is connected to a vertical net segment 360. The vertical net segment 360 is in turn connected to horizontal net segments 362, 364. The horizontal net segments 362, 364 are then connected to H clusters 366, 368, 370, 372. Each of the H clusters 366, 368, 370, 372 contains four nodes, such as four end nodes (e.g., clock sinks) 374, 376, 378, 380, respectively. Net segments 360, 362, 364 form a Latin letter "H", which is electrically connected to H clusters 366, 368, 370, 372, hence the name "H-tree." In some examples, buffers may be inserted along the various net segments of the H-tree structure 354 to further improve timing and clock signal integrity. Using the H-tree structure 354 provides for improved signal timing and cross-corner scaling is better balanced, where clock sinks at corners of the layout receive the clock signal with minimal or no delay.

Clock signal networks can be built from structures such as the Y-tree structure 300, the X-tree structure 328, and/or the H-tree structure 354, to provide for improved signal transmission and signal quality. Other structures can also be used, such as mesh structures, other tree structures, geometric structures, and the like. The structures, including the Y-tree structure 300, the X-tree structure 328, and the H-tree structure 354, can also be combined with each other. Buffers can be inserted along net segments in any of the aforementioned structures, e.g., Y-tree structure 300, X-tree structure 328, and H-tree structure 354, including at net segment intersections, as further described below.

FIG. 4A illustrates an example clock signal network layout 400 that includes a clock source 402 electrically coupled to two clock sinks 404, 406 (e.g., flip-flops). The clock signal network layout 400 may be included in or used with any type of clock structure, such as the clock structures 300, 328, and 354 described previously. The clock signal traverses a net segment 408 and a net segment 410 to reach the clock sink 404. The clock signal additionally traverses a net segment 412 and a net segment 414 before reaching the clock sink 406. The lengths of the net segment 408, 410, 412, 414 can include lengths that could cause signal delays and other issues, due to, for example, RC properties of the net segments.

Timing slack is a margin by which a timing requirement is met or not met. Positive slack indicates the margin by which a requirement is met, while negative slack indicates the margin by which a requirement is not met. For each clock sink, e.g., clock sink 404 and clock sink 406, a positive or negative timing slack is derived based on a desired arrival time of the clock signal minus the actual arrival time of the clock signal. For example purposes, we will allocate a desired arrival time of 500 picoseconds (ps) to the clock signal arriving at the clock sink 404, and a desired arrival time of 300 ps to the clock signal arriving at the clock sink 406. If the clock signal arrives at the clock sink 404 at 300 ps then the timing slack for clock sink 404 is of +200 ps. If the clock signal arrives at the clock sink 406 at 400 ps then the timing slack for clock sink 406 is of −100 ps. In one example, RPS is the timing slack of the most negative of the clock sinks' timing slack. In our example, the RPS for root pin 426 is of −100 ps because the most negative clock sink timing slack of −100 ps for the clock source's root pin 426 is found based on the clock sink 406 timing slack.

Having an RPS with undesired values could lead to timing issues. More negative RPS results in a worse or more delay and more positive RPS results in a better or less delay. Accordingly, one or more buffers are inserted along the net segment 408, 410, 412, 414 to ameliorate or improve the signal delays and other issues, as shown in FIG. 4B. More specifically, FIG. 4B illustrates the insertion of buffers 416, 418, 420, 422, 424 into the clock signal network layout 400 along various locations of net segment 408, 410, 412, 414, according to some examples. The buffers 416, 418, 420, 422, 424 can be provided in different sizes and types (e.g., buffers, inverters). Accordingly, buffers carry different capacitance and cost (e.g., due to power and area used), and use different cell area sizes in the layout. Larger buffers are suitable for transmitting the clock signal with less delay but use more cell area while smaller buffers use less area but transmit the clock signal with more delay. In certain examples, each buffer is assigned a unit area, such as 1 unit cell area, 2 unit cell area, and so on, based on size. Several buffering solutions are possible, each solution inserting buffers at different locations, as well as using different buffer sizes (e.g., having different cell areas) and types. An example buffer insertion (also referred to as "buffering") process is shown in FIG. 5.

Figure 5:
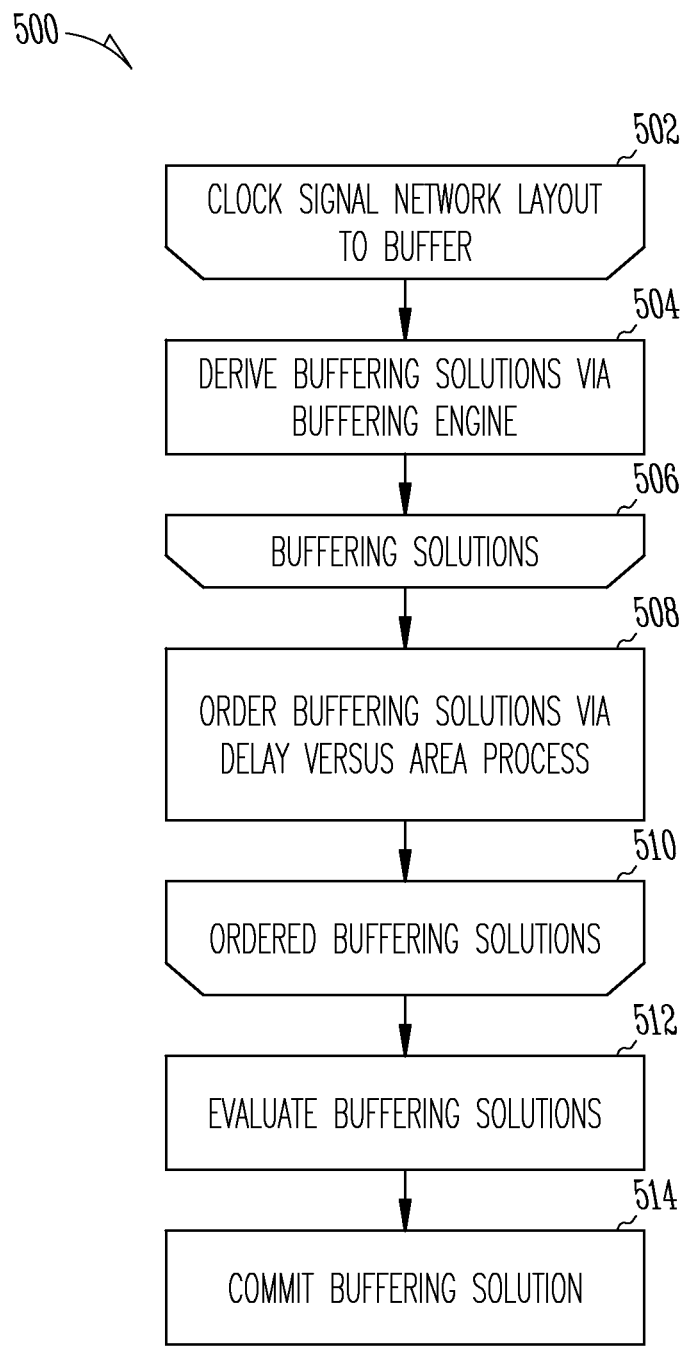
FIG. 5 is a flowchart of a buffer insertion process, according to some embodiments.

FIG. 5 is an example flowchart of a process 500 suitable for deriving various buffering solutions, ordering the buffering solutions based on selected criteria, and committing a buffering solution as part of an IC design, according to some examples. In the depicted example, the process 600 uses as input an unbuffered clock tree net 502. The clock tree net 502 (e.g., a net segment of an existing tree network) can include any type of topology, such as Y-trees, X-trees, H-trees, or combination thereof as previously described above, for example, with respect to FIGS. 3A-3C. In the depicted example, a buffering engine is used to derive, at block 504, various bufferings 506 (e.g., also referred to as buffer insertion solutions and/or buffering solutions) for the clock tree net 502.

Each buffering solution includes a different total number of buffers, a different buffer placement, and/or a different number of buffers by buffer size (e.g., in unit areas). In certain examples, the buffering engine "walks" along the net segments in clock tree net 502 and for each buffering solution, places buffers along the clock tree net 502. That is, a first buffering solution positions buffers at X micrometers apart, while a second buffering solution positions buffers at Y nanometers apart, where Y is greater than X. Other buffering solutions position a larger buffer instead of using, for example, two, three, or more smaller buffers. Some buffering solutions position a buffer at every intersection of net topology, while other buffering solutions take into account net lengths to decide whether or not to place a buffer at the intersection. Accordingly, the buffering solutions 506 include a mix of buffer sizes, buffer types, and placement of the buffers along net segments.

The process 500 orders, at block 508, the various bufferings 506 via a delay versus area process, resulting in a set of ordered buffering solutions 510. The buffering solutions returned from 508 form a buffering solution curve of delay versus area. Then from the curve, solutions satisfying the delay thresholds are ranked based on ROI, e.g., slope, in 510. That is, delay value (e.g., RPS) for each buffering solution versus a total area (e.g, total cell area of all buffers in the buffering solution) is used to create an order (e.g., slope order) for the ordered buffering solutions 510, that ranks the ordered buffering solutions 510, for example, from more optimal to less optimal, as further described below. The ordered buffering solutions 510 are then evaluated, at block 512, to determine, for example, if a buffering solution satisfy various metrics (e.g. DRV, clock net delay, area, and so on) as a final inspection to ensure quality of results. The first buffering solution satisfying the metrics gets committed in 514. If the ordered buffering solutions 510 satisfy various metrics (e.g. design rule violation metrics, clock net delay metrics, area size metrics, and so on the first buffering solution in the order to satisfying the metrics gets committed at block 514. That is, the process 500 then commits, at block 514, the automatically selected buffering solution (e.g., buffering solution that passes the evaluation at block 512) or any user-selected buffering solution into the IC design. By providing for multiple buffering solutions and then reordering the buffering solutions based on a delay versus area approach, the techniques described herein provide for a more optimal buffering solution that balances delays with cell area used.

Figure 6:
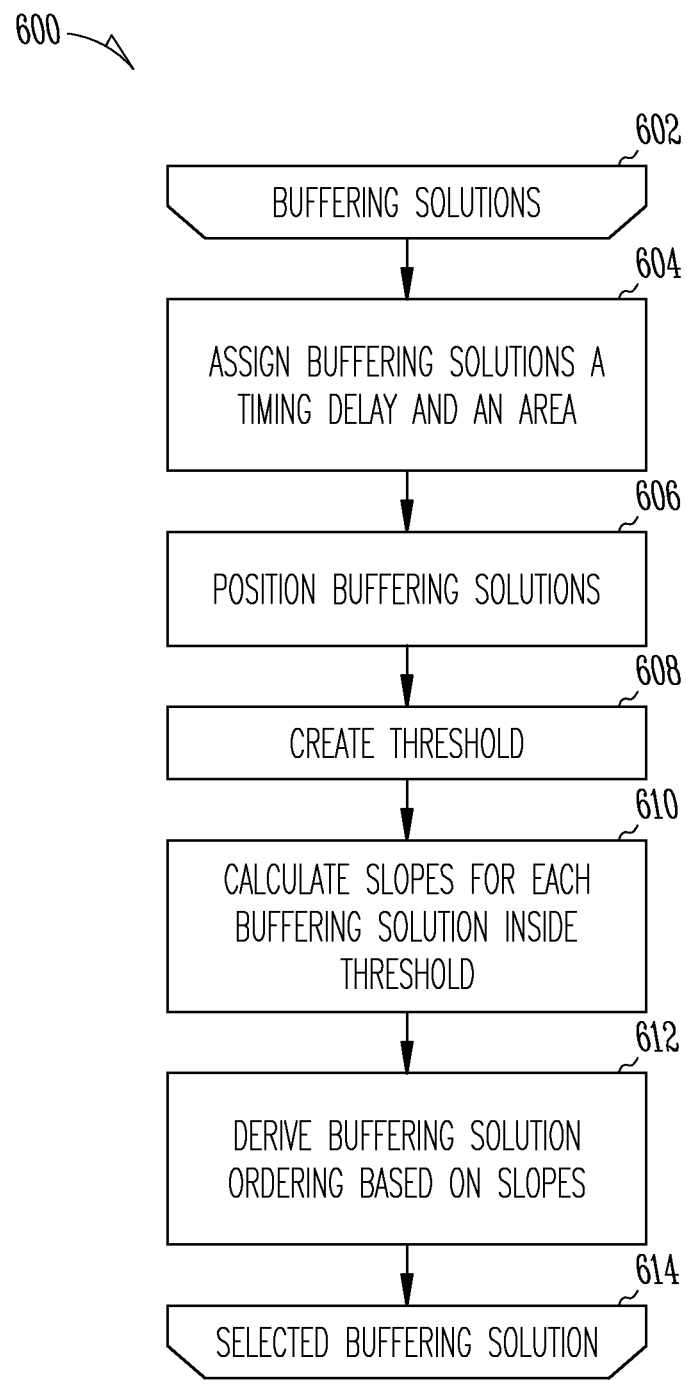
FIG. 6 is a flowchart of a process for reordering a set of buffer solutions and selecting a buffering solution based on a buffering solution delay versus die area used, according to some embodiments.

FIG. 6 is a flowchart depicting an example process 600 for ordering a set of buffering solutions 602 and selecting a buffering solution 602 based on a buffering solution delay versus die area used, according to some examples. It is to be understood that, in some examples, multiple buffering solutions 602 may be derived, via the process 600, and the user can then apply any one of the selections to use for a given circuit design. In the depicted embodiment, the process 600 uses as input, buffering solutions 602, such as the buffer solutions created via block 504 of process 500 described above. Each of the buffering solutions 602 then gets assigned, at block 604, a RPS value and an area (e.g., cell area) value. The more negative the RPS value the longer the delay, and vice versa. For example, each buffering solution has the RPS value of the clock source derived, in certain examples, by finding the most negative timing slack of all clock sinks in each of the buffering solutions. The area value for each buffering solution is derived by calculating the total area (e.g., cell area) values of all buffers for each buffering solution. As mentioned earlier, different buffers may have different area sizes. For example, certain larger buffers are used to transmit the clock signal with less delay when compared to smaller buffers.

The process 600 then positions, at block 606, the buffering solutions by using the assigned RPS value and total area value of each buffering solution. In one example, the buffering solutions are positioned by plotting each buffering solution as a point in a buffering solution delay (e.g., RPS) versus area graph. The RPS versus area graph has a Y axis having RPS values and an X axis having area (e.g., cell area) values. The area values are calculated by summing the area of all buffers in the particular buffering solution. The process 600 then creates, at block 608, a threshold (e.g., delay threshold) to apply. In one example, the threshold is a desired range of RPS values for the buffering solution. That is, the delay or RPS threshold is used to only consider buffering solutions with delay faster or RPS more positive than the threshold. The threshold can be user defined. Wider thresholds will include a larger number of buffering solutions, while narrower thresholds will include less buffering solutions.

The process 600 then calculates, at block 610, a slope for each buffering solution that satisfies (e.g, is inside) the threshold. The slopes are calculated by first finding the buffering solution $B_{min}$ that has the least area. In some cases, $B_{min}$ can be outside of the threshold. $B_{min}$ will have an RPS value of $BMIN_{RPS}$ and an area value of $BMIN_{area}$. For a buffering solution SOL having an RPS value of $BSOL_{RPS}$ and an area value of $BOL_{area}$, the slope is:

$$\frac{BSOL_{RPS} - BMIN_{RPS}}{BSOL_{area} - BMIN_{area}},$$

which is representative of how much delay gain versus area cost a given buffering solution has. A higher slope is indicative of a higher efficiency.

Once the slopes for all the buffering solutions have been calculated, the buffering solutions can be ordered, at block 612, based on slope values. For example, an ordering can be derived based on slope in a decreasing order such that the buffering solution with more positive slope is prioritized. That is, an ordering can rank based on steepest slope value (e.g., highest angle) to gentlest slope value (e.g., smallest angle). In one example, the buffering solution that has the steepest slope value is then selected as the selected buffering solution 614 to use for buffering the clock tree net. By providing for a buffering solution delay or RPS versus area approach to select and order buffering solutions (e.g., in blocks 610 and 612), the techniques described herein provide for a more efficient and flexible buffering techniques.

It may be useful to illustrate an example set of buffering solutions and the application of the processes 500 and 600 described previously. Accordingly and turning now to FIG. 7A, the figure illustrates and example timing delay (e.g., RPS) versus area graph 700, according to some examples. The graph 700 has a Y axis 702 having RPS values and an X axis 704 having total area values. The Y axis 702 values are representative of the RPS for each buffering solution while the X axis 704 values are representative of total buffer area (e.g., total cell area) for each buffering solution. Each of the buffering solutions created, for example, via the process 500, can be displayed as a point in the delay (e.g., RPS) versus area graph 700.

In the depicted example, eleven buffering solutions are displayed. A buffering solution 706 has the lowest RPS value while a buffering solution 708 has a highest RPS value. Also shown are a high threshold 710, a medium threshold 712, and a low threshold 714. Use of the high threshold 710 will result in less buffering solutions to compare (e.g., via a slope comparison approach) while using the low threshold 714 will result in more buffering solutions to compare. In the depicted embodiment, the use of the high threshold 710 will include five buffering solutions to compare, including buffering solutions 708 and 716. The use of the medium threshold 712 will include seven buffering solutions to compare, including buffering solutions 708, 716, and 718, and the use of the medium threshold 712 will include ten buffering solutions to compare, including buffering solutions 708, 716, 718, and 720. Once the thresholds 710, 712, 714 are created, for example, either using automated default thresholds or via user-defined thresholds, certain buffering solutions that fall inside of a selected threshold are then used to find a more optimal buffering solution, as shown in FIG. 7B.

Figure 7A:
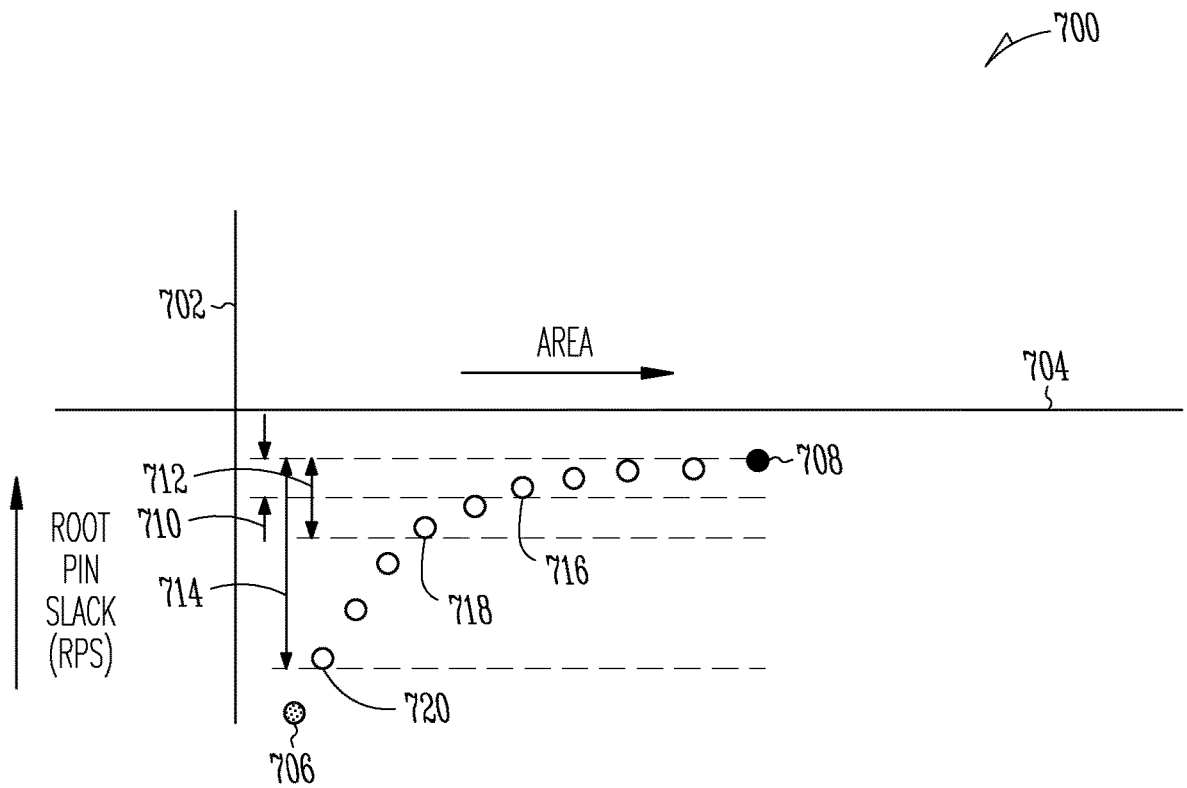
FIG. 7A illustrates a buffering delay versus area graph, according to some embodiments.
Figure 7B:
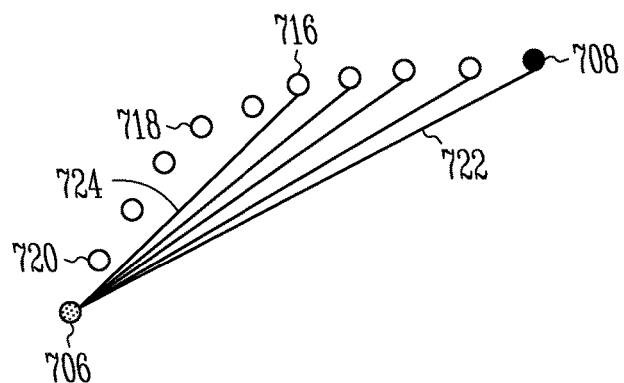
FIG. 7B illustrates a set of buffering solutions with some buffering solutions selected for slope calculations, according to some embodiments.

Turning now to FIG. 7B, the figure depicts the same buffering solution as those depicted in FIG. 7A, according to certain examples. More specifically, the figure depicts example slope lines between certain buffering solutions, such as slope lines 722, 724. As mentioned earlier, buffering solutions can be compared by first finding the buffering solution with the smallest, which in our depicted example is buffering solution 706. In the depicted example, slope lines, such the slope lines 722, 724, are created for all buffering solutions that fall in the high threshold 710. In some examples, the slopes are calculated only for buffering solutions that satisfy a certain threshold, such as the threshold 710.

The slope line 722 connects the buffering solution 706 to the buffering solution 708, while the slope line 724 connects the buffering solution 706 with the buffering solution 716. As illustrated, the steepest slope line is slope line 724, while the gentlest slope line is slope line 722. Because buffering solution 716 has the steepest slope, the preferred buffering solution is, in some examples, the buffering solution 716. Buffering solution 716 with the steepest slope has the highest ROI. More specifically, the selected buffering solution 716 provides a more balanced approach to reducing or eliminating timing delays while balancing die area used to insert the buffers. Accordingly, buffering solution 716 is preferred over other buffering solutions satisfying the delay threshold, as it has the best delay versus area tradeoff or ROI. Buffering solution 708 has the gentlest slope and lowest ROI. In some examples, a list of buffering solutions is created and presented to the user, ordered by slope. Accordingly, the user can then select a buffering solution to use for the IC design being created.

Although the described flowcharts can show operations as a sequential process, many of the operations can be performed in parallel or concurrently. In addition, the order of the operations may be re-arranged. A process is terminated when its operations are completed. A process may correspond to a method, a procedure, an algorithm, etc. The operations of methods may be performed in whole or in part, may be performed in conjunction with some or all of the operations in other methods, and may be performed by any number of different systems, such as the systems described herein, or any portion thereof, such as a processor included in any of the systems.

Figure 8:
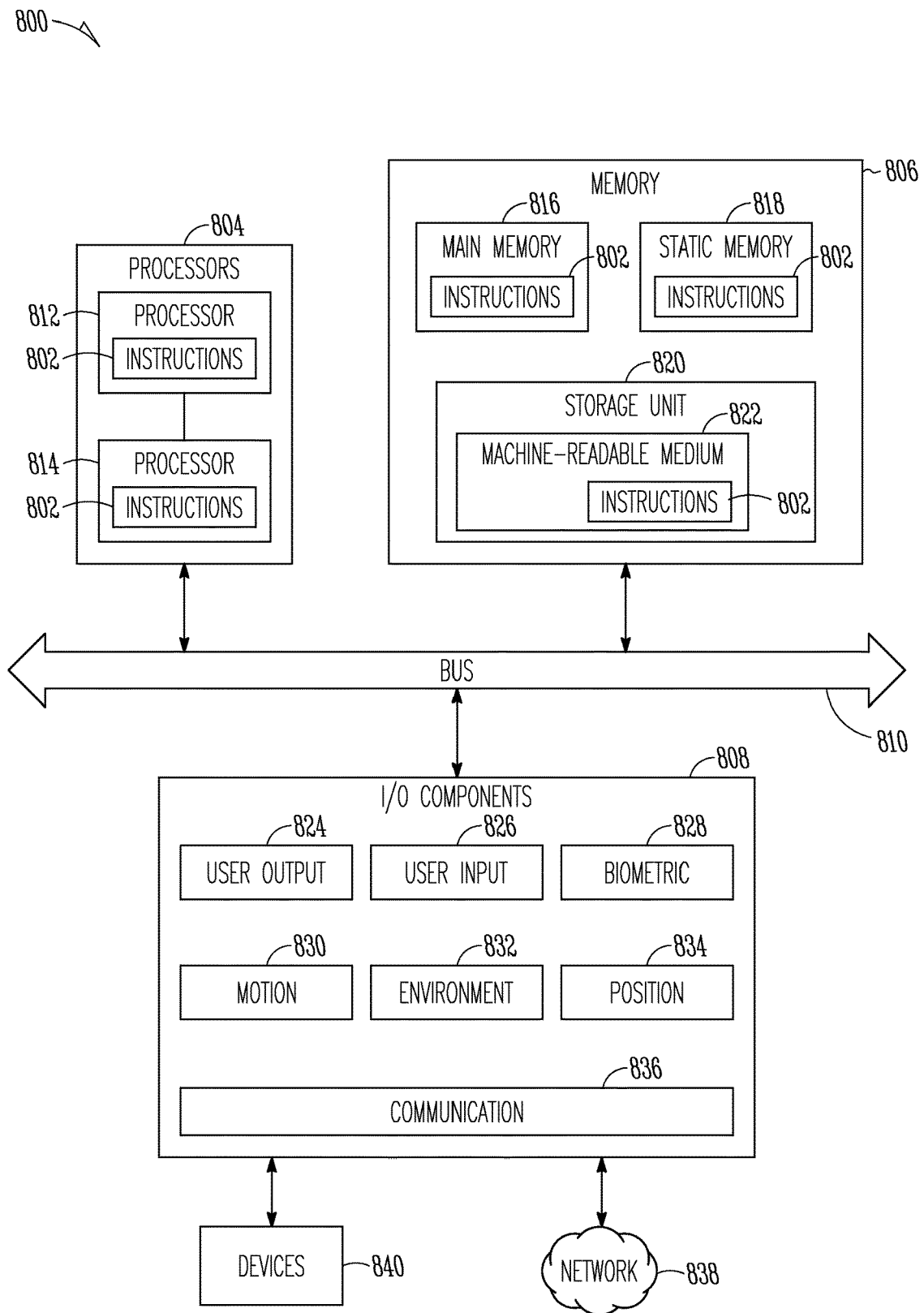
FIG. 8 is a block diagram depicting a machine suitable for executing instructions via one or more processors, according to some examples.

FIG. 8 is a diagrammatic representation of a machine 800 within which instructions 802 (e.g., software, a program, an application, an applet, an app, or other executable code) for causing the machine 800 to perform any one or more of the methodologies discussed herein may be executed. For example, the instructions 802 may cause the machine 800 to execute any one or more of the processes or methods described herein, such as the processes 500 and 600. The instructions 802 transform the general, non-programmed machine 800 into a particular machine 800 programmed to carry out the described and illustrated functions in the manner described. The machine 800 may operate as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 802, sequentially or otherwise, that specify actions to be taken by the machine 800. Further, while a single machine 800 is illustrated, the term "machine" shall also be taken to include a collection of machines that individually or jointly execute the instructions 802 to perform any one or more of the methodologies discussed herein. In some examples, the machine 800 may also comprise both client and server systems, with certain operations of a particular method or algorithm being performed on the server-side and with certain operations of the particular method or algorithm being performed on the client-side.

The machine 800 may include processors 804, memory 806, and input/output I/O components 808, which may be configured to communicate with each other via a bus 810. In an example, the processors 804 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application-Specific Integrated Circuit (ASIC), a Radio-Frequency Integrated Circuit (RFIC), another processor, or any suitable combination thereof) may include, for example, a processor 812 and a processor 814 that execute the instructions 802. The term "processor" is intended to include multi-core processors that may comprise two or more independent processors (sometimes referred to as "cores") that may execute instructions contemporaneously. Although FIG. 8 shows multiple processors 804, the machine 800 may include a single processor with a single-core, a single processor with multiple cores (e.g., a multi-core processor), multiple processors with a single core, multiple processors with multiples cores, or any combination thereof.

The memory 806 includes a main memory 816, a static memory 818, and a storage unit 820, both accessible to the processors 804 via the bus 810. The main memory 816, the static memory 818, and storage unit 820 store the instructions 802 embodying any one or more of the methodologies or functions described herein. The instructions 802 may also reside, completely or partially, within the main memory 816, within the static memory 818, within machine-readable medium 822 within the storage unit 820, within at least one of the processors 804 (e.g., within the processor's cache memory), or any suitable combination thereof, during execution thereof by the machine 800.

The I/O components 808 may include a wide variety of components to receive input, provide output, produce output, transmit information, exchange information, capture measurements, and so on. The specific I/O components 808 that are included in a particular machine will depend on the type of machine. For example, portable machines such as mobile phones may include a touch input device or other such input mechanisms, while a headless server machine will likely not include such a touch input device. It will be appreciated that the I/O components 808 may include many other components that are not shown in FIG. 8. In various examples, the I/O components 808 may include user output components 824 and user input components 826. The user output components 824 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 826 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 808 may include biometric components 828, motion components 830, environmental components 832, or position components 834, among a wide array of other components. For example, the biometric components 828 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 830 include acceleration sensor components (e.g., accelerometer), gravitation sensor components, rotation sensor components (e.g., gyroscope).

The environmental components 832 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 834 include location sensor components (e.g., a global positioning system (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 808 further include communication components 836 operable to couple the machine 800 to a network 838 or devices 840 via respective coupling or connections. For example, the communication components 836 may include a network interface component or another suitable device to interface with the network 838. In further examples, the communication components 836 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 840 may be another machine or any of a wide variety of peripheral devices (e.g., a peripheral device coupled via a universal serial bus (USB) port), internet-of-things (IoT) devices, and the like.

Moreover, the communication components 836 may detect identifiers or include components operable to detect identifiers. For example, the communication components 836 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 836, such as location via Internet Protocol (IP) geolocation, location via Wi-Fi® signal triangulation, location via detecting an NFC beacon signal that may indicate a particular location, and so forth.

The various memories (e.g., main memory 816, static memory 818, and memory of the processors 804) and storage unit 820 may store one or more sets of instructions and data structures (e.g., software) embodying or used by any one or more of the methodologies or functions described herein. These instructions (e.g., the instructions 802), when executed by processors 804, cause various operations to implement the disclosed examples.

The instructions 802 may be transmitted or received over the network 838, using a transmission medium, via a network interface device (e.g., a network interface component included in the communication components 836) and using any one of several well-known transfer protocols (e.g., hypertext transfer protocol (HTTP)). Similarly, the instructions 802 may be transmitted or received using a transmission medium via a coupling (e.g., a peer-to-peer coupling) to the devices 840.

A cloud deployment and/or cloud computing is supported by having certain components of the machine 800, e.g., processors 804, memory 806, bus 810, and/or I/O components 808 included in a cloud environment and used via cloud-based techniques. For example, certain components of the machine 800 may be disposed in cloud server facilities and communicatively coupled to client devices 840 to execute the process flow 100 or portions of the process flow 100 "in the cloud." Accordingly, processes, such as process 500 and/or 600, can be cloud-based processes executable in the cloud. That is, a user can access the techniques described herein in the cloud to create, modify, and/or deploy a variety of IC designs and IC features.

The techniques described herein provide for a buffer solution selection process that takes into account both buffering solution timing delays and area when selecting among a variety of buffering solutions. Each buffering solution incorporates a different number of buffers, buffer types, and/or buffer placements. In certain examples, each buffering solution has a RPS or delay value and an area value. One buffering solution $B_{min}$ is selected as having the most minimal area, and the remainder buffering solutions satisfying a certain threshold have a slope value measured or otherwise assigned based on $B_{min}$. The buffering solution having the steepest slope is then selected as the preferred buffering solution, balancing timing delay with area. The buffering solutions are ordered based on decreasing order of slope or ROI, as solutions with higher ROI are preferred for their efficiency

What is claimed is:

1. A system comprising:
   one or more processors of a computing machine; and
   a computer storage medium storing instructions, which when executed by the one or more processors, cause the computing machine to perform operations comprising:
   receiving a clock signal network layout, the clock signal network layout comprising a clock source electrically coupled to a plurality of clock sinks via a plurality of net segments;
   creating a plurality of buffering solutions, each buffering solution of the plurality of buffering solutions comprising a plurality of buffers inserted into one or more net segments of the plurality of net segments;
   assigning a timing delay value and an area value to each buffering solution of the plurality of buffering solutions;
   selecting a buffering solution from the plurality of buffering solutions based on the timing delay value and the area value; and
   applying the selected buffering solution into an integrated circuit (IC) design that comprises the clock signal network layout.

2. The system of claim 1, wherein the timing delay value comprises a root-pin slack (RPS) value, and wherein the RPS value comprises a most negative clock sink timing slack value of all clock sinks in the plurality of clock sinks.

3. The system of claim 1, wherein for each buffering solution, the area value is calculated by summing buffer cell area values for all buffers included in the buffering solution.

4. The system of claim 1, wherein selecting the selected buffering solution comprises:
   selecting a set of buffering solutions based on timing delay and area value; and
   selecting the selected buffering solution from the set of buffering solutions.

5. The system of claim 4, wherein selecting the set of buffering solutions comprises selecting a threshold range of RPS values and selecting buffering solutions that have RPS values inside of the threshold range of RPS values as the selected set of buffering solutions.

6. The system of claim 5, wherein selecting the selected buffering solution comprises:
   calculating a slope for each buffering solution in the selected set of buffering solutions; and
   selecting the selected buffering solution based on the slope.

7. The system of claim 6, wherein calculating the slope for each buffering solution in the selected set of buffering solutions comprises:
   selecting a first buffering solution from the plurality of buffering solutions that comprises a smallest area of all buffering solutions in the plurality of buffering solutions; and
   calculating a slope line that begins in the first buffering solution and that ends in each respective buffering solution in the selected set of buffering solutions.

8. The system of claim 7, wherein calculating the slope line comprises using an equation comprising:

$$\frac{BSOL_{RPS} - BMIN_{RPS}}{BSOL_{area} - BMIN_{area}},$$

where $BSOL_{RPS}$ is the buffering solution RPS value, $BMIN_{RPS}$ is the first buffering solution RPS value, $BSOL_{area}$ is the buffering solution area value and $BMIN_{area}$ is the first buffering solution area value.

9. The system of claim 7, wherein selecting the buffering solution comprises selecting the buffering solution having a steepest slope line.

10. The system of claim 1, wherein the clock signal network layout comprises at least one of a Y-tree structure, an X-tree structure, an H-tree structure, or a combination thereof.

11. The system of claim 1, wherein creating the plurality of buffering solutions comprises:
    creating a first buffering solution by positioning a first set of buffers along the net segments at least X nanometers apart; and
    creating a second buffering solution by positioning a second set of buffers along the net segments at least Y nanometers apart where X is not equal to Y.

12. The system of claim 1, wherein selecting the selected buffering solution from the plurality of buffering solutions comprises:
    providing, to a user, an ordered list of buffering solutions based on a slope calculation that uses timing delay value and area value; and
    receiving, from the user, the selected buffering solution from the ordered list of buffering solutions.

13. The system of claim 1, wherein the operations comprise evaluating the selected buffering solution to determine if a design rule violation (DRV) exists before applying the selected buffering solution.

14. The system of claim 13, wherein determining that a DRV exists comprises at least one of determining that a maximum transition time on input pins of the clock signal network layout has been exceeded, or determining that a maximum capacitive load on output pins of the clock signal network layout.

15. The system of claim 1, wherein the plurality of buffers comprises a first buffer comprising a cell area X and a second buffer comprising a cell area Y, and wherein X is not equal to Y.

16. A method comprising:
    receiving a clock signal network layout, the clock signal network layout comprising a clock source electrically coupled to a plurality of clock sinks via a plurality of net segments;

creating a plurality of buffering solutions, each buffering solution of the plurality of buffering solutions comprising a plurality of buffers inserted into one or more net segments of the plurality of net segments;

assigning a timing delay value and an area value to each buffering solution of the plurality of buffering solutions;

selecting a buffering solution from the plurality of buffering solutions based on the timing delay value and the area value; and applying the selected buffering solution into an integrated circuit (IC) design that comprises the clock signal network layout.

17. The method of claim 16, wherein the timing delay value comprises a RPS value, and wherein the RPS value comprises a most negative clock sink timing slack value of all of the plurality of clock sinks.

18. The method of claim 16, wherein, for each buffering solution, the area value is calculated by summing buffer cell area values for all buffers included in the buffering solution.

19. A non-transitory computer storage medium storing instructions, which when executed by a machine, cause the machine to perform operations comprising:

receiving a clock signal network layout, the clock signal network layout comprising a clock source electrically coupled to a plurality of clock sinks via a plurality of net segments;

creating a plurality of buffering solutions, each buffering solution of the plurality of buffering solutions comprising a plurality of buffers inserted into one or more net segments of the plurality of net segments;

assigning a timing delay value and an area value to each buffering solution of the plurality of buffering solutions;

selecting a buffering solution from the plurality of buffering solutions based on the timing delay value and the area value; and applying the selected buffering solution into an integrated circuit (IC) design that comprises the clock signal network layout.

20. The non-transitory computer storage medium of claim 19, wherein the timing delay value comprises a RPS value, the RPS value comprises a most negative clock sink timing slack value of all of the plurality of clock sinks, and wherein for each buffering solution, the area value is calculated by summing buffer area values for all buffers included in each respective buffering solution.

* * * * *